United States Patent
Olszewski et al.

(10) Patent No.: US 7,555,753 B2
(45) Date of Patent: *Jun. 30, 2009

(54) MEASURING PROCESSOR USE IN A HARDWARE MULTITHREADING PROCESSOR ENVIRONMENT

(75) Inventors: Bret Ronald Olszewski, Austin, TX (US); Luc Rene Smolders, Austin, TX (US); Mysore Sathyanarayana Srinivas, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1376 days.

This patent is subject to a terminal disclaimer.

(21) Appl. No.: 10/787,659

(22) Filed: Feb. 26, 2004

(65) Prior Publication Data

US 2005/0198635 A1    Sep. 8, 2005

(51) Int. Cl.
*G06F 9/46* (2006.01)
(52) U.S. Cl. .................. 718/100; 718/102; 718/104; 718/105; 718/101
(58) Field of Classification Search .......... 718/100, 718/101, 102, 104, 105; 702/186
See application file for complete search history.

(56) References Cited

U.S. PATENT DOCUMENTS

| | | | |
|---|---|---|---|
| 6,052,708 A * | 4/2000 | Flynn et al. ............. | 718/108 |
| 6,256,775 B1 | 7/2001 | Flynn ..................... | 717/4 |
| 6,266,745 B1 | 7/2001 | de Backer et al. ......... | 711/147 |
| 6,549,930 B1 | 4/2003 | Chrysos et al. ........... | 709/104 |
| 6,606,704 B1 | 8/2003 | Adiletta et al. ........... | 712/248 |
| 2002/0184290 A1 | 12/2002 | Olszewski et al. ........ | 709/102 |
| 2003/0149716 A1 * | 8/2003 | Peterson ................. | 709/101 |

OTHER PUBLICATIONS

Guangzuo et al., "Parallel Replacement Mechanism for MultiThread", Mar. 1997, IEEE, pp. 338-344.*
Floyd et al., Accounting Method and Logic for Determining Per-Thread Processor Resource Utilization in a Simultaneous Multi-Threaded Processor, U.S. Appl. No. 10/422,025, filed Apr. 23, 2003.
Davis et al, Controller for Multiple Instruction Thread Processors, U.S. Appl. No. 09/542,206, filed Apr. 4, 2000.

* cited by examiner

*Primary Examiner*—Thomas Lee
*Assistant Examiner*—Kenneth Tang
(74) *Attorney, Agent, or Firm*—Matthew W. Baca; Amy J. Pattillo

(57) ABSTRACT

In a multiprocessor system where each processor has the capacity to executing multiple hardware threads, a method, system, and program for monitoring the percentage usage of the total capacity of the physical processors is provided. A processor capacity monitor calculates a logical usage percentage of each of the available hardware threads. In addition, the processor capacity monitor calculates a physical usage percentage of each of the processors by each of the available threads. Then, the processor capacity monitor multiplies the logical usage percentage and physical usage percentage for each of the threads and sums the result. The summed result is divided by the number of physical processors to determine the percentage usage of the total capacity of the physical processors.

2 Claims, 3 Drawing Sheets

| LP1 | | LP2 | | LP3 | | LP4 | |
|---|---|---|---|---|---|---|---|

EXAMPLE 1

402 ⎡ L   P      L   P      L   P      L   P
    ⎣ 100   40     100   60     0    50     0    50

404 — [ 40            60            0            0

TOTAL PHYSICAL UTILIZATION -> 100/2 = 50% — 406

EXAMPLE 2

L   P      L   P      L   P      L   P
100   100    0    0     100   100    0    0

100           0            100         0

TOTAL PHYSICAL UTILIZATION -> 200/2 = 100%

MEASURING PROCESSOR USE IN A HARDWARE MULTITHREADING PROCESSOR ENVIRONMENT

BACKGROUND OF THE INVENTION

1. Technical Field

The present invention relates in general to computer systems in particular to improved hardware multithreading multiprocessor computer systems. Still more particularly, the present invention relates to accurately measuring processor use in a hardware multithreading processor environment.

2. Description of the Related Art

Improvement of computing technology requires improving the performance characteristics of computer systems that operate under dynamically changing load requirements. One method of improving the performance of a computer system is by using multiple processors that share the processing load by executing portions of a computer program or separate computer programs in parallel.

As the number of processors available to a computer system or network of computer systems increases, measuring whether the full capacity of each processor is used becomes increasingly important. Traditional processor measurements tend to use a sample based approach where the state of the operating system is checked at regular intervals. The states identified may include, for example, "running a user program", "running operating system code", "waiting for an input/output (I/O) operation to complete", or "idle." Traditionally, a counter is maintained for each state and incremented with each sample for each processor.

The performance of a computer system can also be improved by enabling multiple hardware threads to execute on a single processor where each thread processes a different program or a different portion of one or more programs. When hardware multithreading is implemented, each thread is typically viewed as a logical processor.

When a system supports multithreading, monitoring the available capacity of each processor becomes even more important. Applying traditional counter monitoring in a multithreaded system, however, will often yield misleading results. In particular, traditional counter monitoring techniques return metrics that do not accurately represent the actual physical use of each processor. For example, consider a two processor system P1 and P2 where each processor has two threads. The monitoring system views the computer system logically as having four processors (LP1, LP2, LP3, and LP4), when physically there are only two. In a first case, a program is run on the two threads of the first processor (LP1 and LP2) while the second processor waits for work; the processor use of each of the logical processors by a program as measured by a counter is 100%, 100%, 0% and 0% respectively. Traditional processor metrics reported for the system would show use of 50% of the total processing capacity. In a second case, a program is run on the first thread of each processor (LP1 and LP3) while the second thread of each processor (LP2 and LP4) waits for work; the processor use by a program of each of the logical processors as measured by the counter is 100%, 0%, 100%, and 0% respectively. Traditional processor metrics reported for the use of the system would again show use of 50% of the total processing capacity. These results are misleading because in the second case, while only 50% of the logical processor capacity is used by the program, both physical processors are in fact used by a program, and thus it is only the benefit of multithreading that is unused. In cases where processor intensive programs are executing, utilizing each physical processor may be more important than using all the available threads. Thus, when hardware multithreading is enabled, it would be advantageous to monitor the use of the total physical processor capacity, rather than the logical processing capacity.

Therefore, in view of the foregoing, it would be advantageous to provide a method, system, and program for monitoring physical processor use in a multithreaded system. In particular, it would be advantageous to provide a method, system, and program for monitoring the percentage of total physical processor usage in a multi-processor, multithreaded system.

SUMMARY OF THE INVENTION

Therefore, the present invention in general provides improved hardware multithreading multiprocessor computer systems. Still more particularly, the present invention provides a method, system, and program for accurately measuring processor use in a hardware multithreading processor environment.

According to one embodiment of the present invention, a system has multiple physical processors, where each processor is capable of executing multiple threads. A memory is coupled to the physical processors. Within the memory is an operating system including a processor capacity monitor for monitoring the usage of the total capacity of the physical processors. In particular, the operating system may view each of the threads as a logical processor.

To monitor the usage of the total capacity of the physical processors, the processor capacity monitor measures a logical usage percentage of each of the multiple threads. In particular, a counter within the operating system may be incremented during each cycle to indicate whether a program is executing on the thread or whether the thread is idle. In addition, other states of the operating system may be counted.

In addition, to monitor the usage of the total capacity of the physical processors, the processor capacity monitor measures a physical usage percentage of each of the physical processors by each of the threads. In particular, each physical processor preferably maintains a register indicating the number of instruction dispatching cycles executed on each thread during a sample period. The processor capacity monitor reads the register value and calculates a percentage of physical usage by each of the threads.

Next, the processor capacity monitor multiplies the logical usage percentage and physical usage percentage of each thread and sums the results. Finally, the summed result is divided by the number of physical processors. The result indicates the percentage of the total capacity of the physical processors used during the sampling period.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
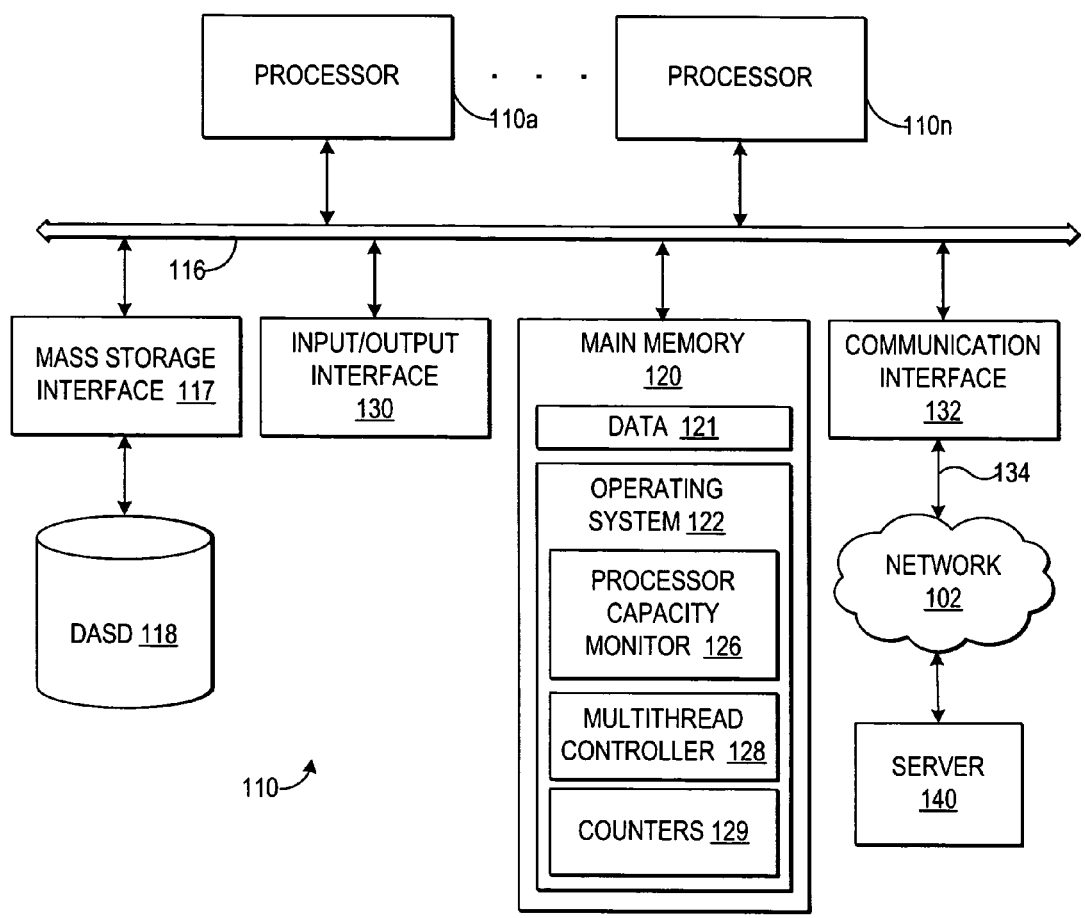
FIG. 1 is a block diagram depicting a computer system in which the present method, system, and program may be implemented.

Referring now to the drawings and in particular to FIG. 1, there is depicted one embodiment of a system in which the present invention may be implemented. It will be understood that while FIG. 1 depicts one embodiment of a system, the present invention may be executed in a variety of systems, including a variety of computing systems and electronic devices.

As depicted, a computer system 100 includes a bus 116 or other communication device for communicating information within computer system 100. Bus 116 preferably includes low-latency and high latency paths that are connected by bridges and adapters and controlled within computer system 100 by multiple bus controllers.

Coupled to bus 116 are multiple processors (such as processors 110a-110n), a mass storage device interface 117, an input/output (I/O) interface 130, a main memory 120, and a communication interface 132. It will be understood that alternate and additional components may be connected to bus 116 in computer system 100.

Mass storage interface 117 is used to connect mass storage devices, such as a direct access storage device (DASD) 118 to computer system 100. It will be understood that multiple types of mass storage devices may be connected to computer system 100 and viewed logically as a single logical disk or multiple logical disks of data storage.

Figure 3:
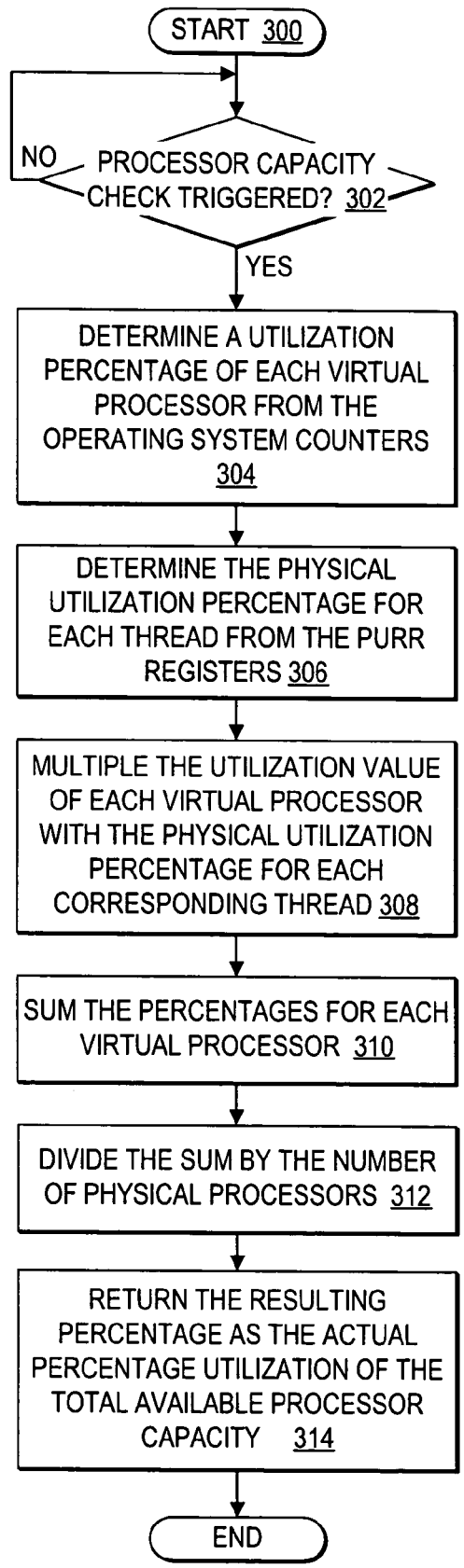
FIG. 3 is a high level logic flowchart depicting a process and program for determining physical processor capacity in a multithreaded system.

Processors 110a-110n may be general purpose processors, such as IBM's PowerPC™ processors that, during normal operation, process data under the control of operating system 122 and application software accessible from main memory 120 and mass storage devices to carry out the operations depicted in the flowchart of FIG. 3. Alternatively, the steps of the present invention might be performed by specific hardware components that contain hardwired logic for performing the steps, or by any combination of programmed computer components and custom hardware components.

Main memory 120 preferably includes data 121 and operating system 122. Main memory 120 may include dynamic storage devices, such as random access memory (RAM) and static storage devices such as Read Only Memory (ROM). Data 121 represents any data that serves as input to or output from any program in computer system 100. It will be understood that computer system 100 may implement logical addressing that organizes all the available memory of the system into logical disks instead of individual memory component such as main memory 120 and DASD 118. Therefore, while data 121 and operating system 122 are depicted as residing in main memory 120, those skilled in the art will recognize that these components are not necessarily contained in main memory 120 at the same time. It should also be noted that the term "memory" is used herein to generically refer to the entire logical memory of computer system 100, and may include the logical memory of other computer systems coupled to computer system 100.

According to an advantage of the present invention, operating system 122 includes a processor capacity monitor 126 that monitors the status of each of processors 110a-110n to determine what percentage of the total physical processor capacity is used. Further, operating system 122 includes a hardware multithread controller 128 that adjusts the multithreading characteristics for processors 110a-110n. When hardware multithreading is turned on for a processor, such as processor 110a, then processor 110a can execute multiple threads. Multithread controller 128 may automatically adjust multithreading characteristics of processors 110a-110n or may adjust the multithreading characteristics of processors 110a-110n in response to input from a system administrator. Additionally, operating system 122 includes counters 129 which track the state of the operating system at different intervals. In particular, when multithreading is enabled, operating system 122 views each thread as a logical processor and counters 129 track when programs execute on each logical processor and when each logical processor is idle.

I/O interface 130 is used to connect input and output interfaces to computer system 100. Examples of input interfaces include, but are not limited to a keyboard, a mouse, a touch screen, and a microphone. Examples of output interfaces include, but are not limited to displays, speakers, and printers. The interfaces, such as a display, connected to computer system 100 via I/O interface 130 may be used to allow system administrators and users to communicate with computer system 100. It is important to note that while I/O interface 130 provides one way to communicate with computer system 100, a user may also communicate with computer system 100 via communication interface 132, as will be further described.

It is important to note that the present invention may also be provided as a computer program product, included on a machine-readable medium having stored thereon the machine executable instructions used to program computer system 100 to perform a process according to the present invention. The term "machine-readable medium" as used herein includes any medium that participates in providing instructions to processors 110a-110n or other components of computer system 100 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 100 can read and which is suitable for storing instructions. In the present embodiment, an example of a non-volatile medium is mass storage device 118 which as depicted is an internal component of computer system 100, but will be understood to also be provided by an external device. Volatile media include dynamic memory such as RAM. Transmission media include coaxial cables, copper wire or fiber optics, including the wires that comprise bus 116. Transmission media can also take the form of acoustic or light waves, such as those generated during radio frequency or infrared data communications.

Moreover, the present invention may be downloaded as a computer program product, wherein the program instructions may be transferred from a remote computer such as a server 140 to requesting computer system 100 by way of data signals embodied in a carrier wave or other propagation medium via a network link 134 (e.g. a modem or network connection) to a communications interface 132 coupled to bus 116. Communications interface 132 provides a two-way data communications coupling to network link 134 that may be connected, for example, to a local area network (LAN), wide area network (WAN) or directly to an Internet Service Provider (ISP). In particular, network link 134 may provide wired and/or wireless network communications to one or more networks, such as a network 102. Network 102 may refer to the worldwide collection of networks and gateways that use protocols, such as Transmission Control Protocol (TCP) and Internet Protocol (IP), to communicate with one another. Network 102 uses electrical, electromagnetic, or optical signals that carry digital data streams. The signals through the various networks and the signals on network link 134 and through communication interface 132, which carry the digital data to and from computer system 100, are exemplary forms of carrier waves transporting the information.

Those of ordinary skill in the art will appreciate that the hardware depicted in FIG. 1 may vary. Furthermore, those of ordinary skill in the art will appreciate that the depicted example is not meant to imply architectural limitations with respect to the present invention.

Figures 2, 4:
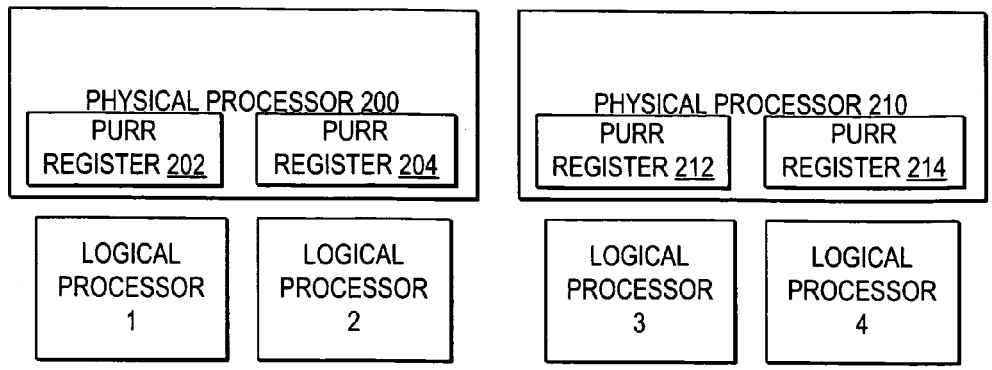
FIG. 2 is a block diagram illustrating an example of the logical view of physical processors in a multithreaded system.
FIG. 4 is a table illustrating examples of determinations the percentage usage of the total capacity of the physical processors in accordance with the method, system, and program of the present invention.

With reference now to FIG. 2, there is depicted a block diagram illustrating an example of the logical view of physical processors in a multithreaded system. In the example, a system includes physical processors 200 and 210. Each of physical processors 200 and 210 may include multiple processing units, levels of memory and cache, and other components. For purposes of implementing a multithreaded system, each of physical processors 200 and 210 is enabled to process multiple threads. Specifically, in the example, each of physical processors 200 and 210 is enabled to process two threads.

From the operating system point of view, each of the threads is viewed as a logical processor. Thus, as illustrated, physical processor 200 is viewed by the system as logical processor 1 (LP1) and logical processor 2 (LP2) and physical processor 210 is viewed as logical processor 3 (LP3) and logical processor 4 (LP4).

According to an advantage of the present invention, each of physical processors 200 and 210 includes a Processor Utilization Resource Register (PURR) for each thread, such as PURR registers 202, 204, 212, and 214, respectively. In the example, PURR registers 202, 204, 212, and 214 each track the number of instruction dispatching cycles a particular thread receives. When the operating system reads PURR registers 202, 204, 212, and 214, the operating system associates the PURR register values counted for each thread with the respective logical processor. Then, a percentage usage of the physical processor by each logical processor is calculated from the PURR register values. It will be understood that while the present invention is described with reference to PURR registers that count a particular type of processor cycle, other types of registers within each of physical processors 200 and 210 may count other types of processor cycles and processor use, the values of which may be used to calculate the percentage of usage of the total physical processor capacity.

With reference now to FIG. 3, there is depicted a high level logic flowchart of a process and program for determining physical processor capacity in a multithreaded system. As illustrated, the process starts at block 300 and thereafter proceeds to block 302. Block 302 depicts a determination whether a processor capacity check is triggered. As examples, a processor capacity check may be triggered automatically at a particular time interval or by a system administrator. If a processor capacity check is not triggered, then the process iterates at block 302. If a processor capacity check is triggered, then the process passes to block 304.

Block 304 depicts determining a utilization percentage of each logical processor. In particular, a utilization percentage for each logical processor may be determined from the counter values monitored by the operating system which indicate multiple usage values, including programs executing and idleness. Next, block 306 depicts determining a physical utilization percentage for each hardware thread from the PURR registers. The physical utilizations percentage for each thread is that thread's percentage use of the total instruction dispatching cycles recorded for the processor during the sample period. Thereafter, block 308 depicts multiplying the utilization percentage for each logical processor with the physical utilization percentage for the corresponding thread. Then, block 310 depicts summing the percentages for each logical processor. Block 312 depicts dividing the sum by the number of physical processors. Finally, block 314 depicts returning the resulting percentage as the actual percentage usage of the total physical capacity of available processors, and the process ends.

Referring now to FIG. 4, there is depicted a table illustrating examples of determinations the percentage usage of the total capacity of the physical processors in accordance with the method, system, and program of the present invention. For purposes of illustrating the process described in FIG. 3, Examples 1 and 2 are illustrated. As illustrated in Example 1, at reference numeral 402, for each logical processor illustrated in FIG. 2, the logical processor utilization percentage (L) and physical utilization percentage (P) are calculated. Then, as illustrated at reference numeral 404, for each logical processor, the L value is multiplied with the P value. The percentages calculated for each logical processor are summed and then divided by the number of physical processors, as illustrated at reference numeral 406. The resulting value is the actual percentage used of the total physical capacity of available processors.

More specifically, in Example 1, programs are executed on both LP1 and LP2, while LP3 and LP4 remain idle. The L percentage for both LP1 and LP2 is 100%. The L percentage for both LP3 and LP4 is 0%. Next, for purposes of example, the P percentage for LP1 is 40% and the P percentage for LP2 is 60%. In particular, in the case of LP3 and LP4 where no idle loops are executing, both will equally share the lack of instruction dispatching cycles at 50%. When the L percentage is multiplied by the P percentage for each logical processor, the result is LP1 with 40%, LP2 with 60% and LP3 and LP4 each with 0%. When the percentages are summed and divided by the number of physical processors (2), the resulting percentage indicates that 50% of the total available capacity of the physical processors is used.

In Example 2, programs are executed on the first thread of each physical processor. Thus, threads are executed on LP1 and LP3. The L percentage for LP1 and LP3 is 100%, while the L percentage for LP2 and LP4, remaining idle, is 0%. The P percentage for LP1 and LP3 is 100%. Again, the P percentage for LP2 and LP4, remaining idle, is 0% because all the dispatch cycles are received for the threads associated with LP1 and LP3. Thus, when the L percentage is multiple by the P percentage for each logical processor, the result is 100% for LP1 and LP3 and 0% for LP2 and LP4. When the percentages are summed and divided by two, the result is that 100% of the total available capacity of the physical processors is used.

While the invention has been particularly shown and described with reference to a preferred embodiment, it will be understood by those skilled in the art that various changes in form and detail may be made therein without departing from the spirit and scope of the invention.

What is claimed is:

1. A method for measuring use of a plurality of physical processors in a multithreaded system, comprising:

measuring a logical usage percentage of each of a plurality of threads available in a computer system comprising a plurality of physical processors running said plurality of threads;

measuring a physical usage percentage of said plurality of physical processors by each of said plurality of threads by retrieving, from each of said plurality of physical processors, a register value holding a number of instruction dispatching cycles received at each processor for each of a selection from among said plurality of threads executing on each processor and calculating said physical usage percentage of said plurality of physical processors by each of said plurality of threads based on the percentage of said number of instruction dispatching cycles received for each of said plurality of threads;

calculating a percentage usage of a total capacity of said plurality of physical processors from said logical usage percentages and said physical usage percentages by calculating a plurality of usage factors by multiplying said logical usage of each of said plurality of threads with said physical usage percentage corresponding to each of said plurality of threads, calculating a usage sum by summing said plurality of usage factors, and calculating said percentage usage of said total capacity of said plurality of physical processors by dividing said usage sum by the number of said plurality of physical processors.

2. The method according to claim 1 for measuring use of a plurality of physical processors in a multithreaded system wherein measuring a logical usage percentage further comprises:

monitoring a status of an operating system for each of said plurality of threads, wherein said status indicates whether said operating system is running a program or idling each of said plurality of threads; and determining a percentage usage of each of said plurality of threads based on said status.

* * * * *